ALUMINUM STEARATE GELLED MINERAL OIL CONTAINING PROCAINE PENICILLIN WITH OR WITHOUT STREPTOMYCIN OR DIHYDROSTREPTOMYCIN

William Aaron Woodard, North Harrow, England, assignor to Glaxo Laboratories Limited, Greenford, England, a British company No Drawing. Application April 2, 1951, Serial No. 218,918

Claims priority, application Great Britain April 13, 1950

8 Claims. (Cl. 167—53.2)

This invention is concerned with improvements in or relating to the manufacture of veterinary products adapted for use in the treatment of mastitis and associated diseases of the udder, caused wholly or partly by penicillin sensitive organisms.

A composition for the treatment of such mastitis is known comprising a suspension of procaine penicillin G in a gel consisting of arachis oil and aluminium stearate; this composition is commonly packed into a collapsible metal tube and is administered to the cow by inserting the mouth of the tube into the teat canal and infusing the contents into the udder.

This known composition however suffers from certain disadvantages, among which may be mentioned the fact that the gel of arachis oil and aluminium stearate is not completely stable and is liable to exhibit syneresis; this may cause leakage of oil from the tube which may result in an undesirable change in the composition of the medicament in the tube and the presence of oil in the container in which the tube is packed.

Moreover it is important to maintain a prolonged concentration of penicillin G in the udder as the longer penicillin G can be maintained in the udder the more certain will be the eradication of the mastitis-producing, penicillin-sensitive organisms.

The object of the present invention is to provide a new and improved composition for the treatment of mastitis caused wholly or partly by penicillin-sensitive organisms which will be more stable and less likely to exhibit syneresis than the said prior composition and which will maintain penicillin G in the udder for a longer time than would the prior composition, under the same conditions.

It has been found that if the arachis oil of the known composition is replaced by a suitable mineral oil as hereinafter defined a composition is obtained which is more stable than the said known composition in that it is less liable to exhibit syneresis, and has the important and surprising advantage that it enables penicillin G to be maintained in the udder of a cow for longer periods than when equivalent doses of the said known composition are used under the same conditions.

It should be noted that both in the case of the prior arachis oil-procaine penicillin G composition—and in that of the composition according to the invention, the time during which penicillin G will be maintained in the udder is very variable from animal to animal and even from quarter to quarter of the same animal.

By the term "a suitable mineral oil" as used herein we mean the mixtures of hydrocarbon oils known in medicine as liquid paraffin and light liquid paraffin (or petroleum), preferably those of the British or United States Pharmacopoeias; the term also includes a mixture of one or more of the oils included under the terms "liquid paraffin" and "light liquid paraffin" with white or yellow soft paraffins and/or such compositions which simulate petroleum jellies and consist essentially of mixtures of hydrocarbons; examples of such last-mentioned compositions are those sold as "Cosmojells 60, 70, and 80." By "white or yellow soft paraffins" is meant the purified and bleached or unbleached mixtures of semi-solid hydrocarbons specified under these terms in the British or United States Pharmacopoeias.

According to the invention therefore, there is provided a preparation adapted for use in the treatment of mastitis caused wholly or partly by penicillin sensitive organisms comprising a suspension of procaine penicillin G in a gel consisting of aluminium stearate and a suitable mineral oil as herein defined.

According to a further feature of the invention there is provided a method of manufacturing a preparation adapted for use in the treatment of such mastitis in which a gel is made from aluminium stearate and a suitable mineral oil and procaine penicillin G is incorporated therein.

Preferably the aluminium stearate should be present in a concentration of from 1 to 8% of the final product, a convenient concentration being about 3%. It will be understood that the exact proportions of aluminium stearate and the suitable mineral oil should be adjusted to suit particular requirements, the greater the proportion of aluminium stearate to mineral oil, the stiffer being the gel obtained. If too great a proportion of aluminium stearate to mineral oil is used, a gel will be obtained which becomes difficult to work.

We use the term "aluminium stearate" in its commercial sense namely to describe the hydroxy stearate of variable composition which may be obtained by the intimate mixing or coprecipitation of aluminium stearate, free stearic and in some cases aluminium hydroxide, irrespective of whether the stearate is a true salt in terms of chemical combination.

We find that the more basic grades of aluminium stearate (i. e. those with a high aluminium content and low stearic acid content) do not produce such satisfactory gels as less basic grades and we prefer to use such grades of aluminium stearate as contain from 8.5–10% aluminium oxide and up to 15% free stearic acid. A typical example of a grade of aluminium stearate which we have found to be suitable has the following analysis.

| | Percent |
|---|---|
| $Al_2O_3$ (washed ash) | 9.0 |
| Water soluble extracts ($Na_2SO_4$) | 2 |
| Moisture | 2 |
| Free fatty acid | 15 |

Xylol gelling test (1 in 20)—bright and colourless and of normal viscosity.

By "procaine penicillin G" we mean a salt of procaine penicillin G containing not less than 85% dry weight of the procaine salt of penicillin G. The salt used should also preferably comply with the following requirements:

1. It should have a potency of not less than 900 units/mg.
2. It should be non-pyrogenic, non-toxic and sterile.
3. Its moisture content should be not more than 4.2%.

The procaine penicillin G is preferably micropulverised before incorpation in the gel.

A convenient concentration of procaine penicillin G in the preparation according to the invention is about 3.5% by weight and we prefer to pack the preparation in collapsible metal tubes each containing for example 3 gms. of it, each tube thus preferably containing about 105,000 units of procaine penicillin G.

It is also advantageous in some cases additionally to introduce streptomycin or dihydrostreptomycin in the form of a therapeutic salt thereof (for example the sulphate) into the preparation according to the invention since certain mastitis-producing organisms appear to be resistant to penicillin G whereas they are not resistant to streptomycin or dihydrostreptomycin.

In general it is preferable that in cases where one or more of the stated additional materials are incorporated in the preparation, the amounts of such substances should be additional to and not in reduction of the stated preferred concentration of procaine penicillin G.

In order that the invention may be well understood we now describe by way of example only, methods of manufacturing preparations according to the invention:

*Example 1.*—45 g. of aluminium stearate (100 mesh powder) is thoroughly mixed with 150 g. of filtered medicinal liquid paraffin B. P. in a previously tared 2 litre bolthead flask provided with a sidearm and thermometer pocket. When the solid is completely mixed in, a further 1,252 g. of filtered liquid paraffin is added with continuous agitation for half an hour. The temperature is raised (about 5° per minute) by means of an electrothermal heating mantle to 80° C. whereafter heating is retarded to maintain the mixture in this range for approximately 30 minutes. During this stage, agitation is continuously maintained and the sidearm of the flask is open to permit the escape of moisture. After dehydration the side-arm is closed and the mixture is maintained at a temperature of 80–100° C. During this stage, the mixture becomes appreciably clearer and its viscosity increases. Heating is closely controlled during the period just before the gel forms and sufficient agitation maintained to avoid localised overheating. Heating is continued to 150° C. and the mixture is kept at this temperature for 1 hour with continuous stirring. The gel is then allowed to cool slowly with agitation until the temperature has fallen to approximately 100° C. when the contents of the flask are aseptically transferred to a previously sterilised bowl of a Hobart or Peerless mixer. When cold, the product has the consistency of a table jelly and is quite transparent. Before incorporating the procaine penicillin G the solid gel is broken down to a highly viscous mass by slow stirring (first speed) with a Hobart or Peerless paddle type of agitator. Approximately half an hour is required for this stage. Sufficient micropulverised crystalline procaine penicillin G to provide 52.5 mega units of penicillin (i. e. 52.5 g. of the procaine salt calculated at 1000 units per milligramme) is then slowly stirred into the mass with aseptic precautions. After all the procaine salt has been incorporated, agitation (first speed) is continued for half an hour. If desired the product may be refined by aseptic processing through a suitable colloid mill or triple roller mill.

*Example 2.*—(Combination of crystalline procaine penicillin G with dihydrostreptomycin sulphate in mineral oil gel, containing 3% by weight of aluminium stearate.)

45 g. of aluminium stearate (100 mesh powder) is thoroughly mixed with 150 g. of filtered medicinal liquid paraffin as described in Example 1. When the solid is completely mixed in, a further 1,069 g. of filtered liquid paraffin is added with continuous agitation for an hour. This material is then processed in the fashion described in Example 1, thus giving a gel which is suitable for the incorporation of the therapeutic ingredients. Sufficient micropulverised crystalline procaine penicillin G to provide 52.5 mega units of penicillin (i. e. 52.5 g. of the procaine salt calculated at 1,000 units per mg.) is then slowly stirred into the mass, taking aseptic precautions. After the procaine salt has been incorporated, 183.6 g. of dihydrostreptomycin sulphate (i. e. 262.5 mega units, calculated at 715 units per mg.) is slowly stirred into the mass, taking aseptic precautions. After all of the dihydrostreptomycin salt has been added, agitation is continued for half an hour as set forth in Example 1.

*Example 3.*—60 g. of aluminium stearate (100 mesh powder) is thoroughly mixed with 150 g. of filtered light liquid paraffin as described in Example 1. When the solid is completely dispersed, a further 1237.5 g. of light liquid paraffin is added with continuous agitation for one hour. This material is then processed in the fashion described in Example 1. Sufficient micropulverised crystalline procaine penicillin G to provide 52.5 g. is then slowly added as described in Example 1.

*Example 4.*—1185.0 g. of filtered liquid paraffin and 225.0 g. of Cosmojell "60" are heated together to a temperature of 70° C. in a 2 litre bolthead flask provided with a side-arm and thermometer pocket. 37.5 g. of aluminium stearate is then slowly added with continuous agitation and the temperature maintained at 70° C. for half an hour, with the side-arm open. After this period the temperature is raised slowly to 150° C. with the side-arm closed and maintained at this temperature for 1 hour. Heating is closely controlled during the period just before the gel forms which in our experience occurs at temperatures between 90°–105° C. The gel is then allowed to cool slowly with agitation until the temperature has fallen to approximately 110° C. when the contents of the flask are transferred as in Example 1. When cold the product has the consistency of a table jelly and is opaque. 52.5 g. of the micro-pulverised procaine salt is then incorporated as described in Example 1.

The following is a result of field trials which have been carried out to show the increased efficiency of the composition according to the invention as compared with the prior arachis oil-aluminium stearate-penicillin G composition. In each case the quantity of preparation administered to each quarter of the udder contained 100,000 units of penicillin G in the form of the procaine salt.

One infected herd of approximately 30 cows was treated with the arachis oil preparation and another infected herd also of approximately 30 cows, and giving a comparable average milk yield (20–25 lbs. in either case), was treated with the mineral oil preparation. In the herd treated with the arachis oil preparation the average penicillin level in the milk after 72 hours was 0.31 unit per cc. In the herd treated with the mineral oil preparation the average penicillin level in the milk was 0.675 unit per cc. after 96 hours, and 0.37 unit per cc. after 120 hours. An average level of 0.3 unit per cc. was reached after 144 hours as compared with the average level of 0.31 unit per cc. after 72 hours using the arachis oil on the first herd.

A further comparison was made by treating separately the four quarters of the udder of the same infected cow. This technique is quite admissible since the four quarters are in no way connected internally. Each quarter of the infected animal was treated first with the known arachis oil preparation and then, after reinfection, with the mineral oil preparation according to the invention. The following table summarises these results in terms of units of penicillin per ml. of milk after the stated times. The figures marked with an asterisk are the averages of figures obtained in two experiments on the same quarter of the same cow:

| Time after injection, Hours | Quarters | | | | | | | |
|---|---|---|---|---|---|---|---|---|
| | Left Hind | | Right Hind | | Left Fore | | Right Fore | |
| | Arachis Oil | Mineral Oil | Arachis Oil | Mineral Oil | Arachis Oil | Mineral Oil | Arachis Oil | Mineral Oil |
| 24 | 18 | 32 | 57 | 36 | 37* | 48* | 60 | 17 |
| 48 | 0.6 | 1.75 | 6.0 | 5.1 | 9* | 9.3* | 8 | 4 |
| 72 | | | 0.8 | 0.7 | 0.37* | 0.65* | 1.3 | 0.5 |
| 96 | <0.1 | 0.11 | 0.12 | 0.6 | <0.1* | 0.34* | 0.11 | 0.26 |
| 120 | <0.1 | 0.11 | <0.1 | 0.5 | <0.1* | 0.18* | <0.1 | 0.11 |
| 144 | | | | | <0.1* | 0.1* | 0 <0.1 | 0.11 |

I claim:
1. A preparation for the treatment of mastitis caused by penicillin sensitive organisms comprising a suspension of procaine penicillin G in a mineral oil gelled by aluminium stearate.
2. A preparation as claimed in claim 1 in which the mineral oil is liquid paraffin.
3. A preparation as claimed in claim 1 in which the percentage of aluminium stearate in the final product is within the range of from 1 to 8%.
4. A preparation as claimed in claim 1 in which the amount of aluminium stearate in the final product is about 3%.
5. A preparation as claimed in claim 1 in which the amount of procaine penicillin G is about 3.5%.
6. A preparation as claimed in claim 1, which also contains a therapeutic salt of a material selected from the group consisting of streptomycin and dihydrostreptomycin.
7. A preparation for the treatment of mastitis caused by penicillin-sensitive organisms, comprising a suspension of procaine penicillin G in liquid paraffin gelled with aluminium stearate in which the amount of aluminium stearate in the final product is within the range of from one to 8%.
8. A preparation for the treatment of mastitis caused by penicillin-sensitive organisms, comprising a suspension of procaine penicillin G in liquid paraffin gelled with aluminium stearate in which the amount of aluminium stearate in the final product is within the range of from one to 8% and the amount of procaine penicillin G is about 3.5%.

References Cited in the file of this patent

UNITED STATES PATENTS

| Number | Name | Date |
|---|---|---|
| 2,163,588 | Cornish | June 27, 1939 |
| 2,327,564 | Scherer | Aug. 24, 1943 |
| 2,364,151 | McCarthy | Dec. 5, 1944 |
| 2,453,259 | Perkins | Nov. 9, 1948 |
| 2,498,374 | Martin | Feb. 21, 1950 |
| 2,507,193 | Buckwalter | May 9, 1950 |
| 2,584,166 | Stevenson | Feb. 5, 1952 |

OTHER REFERENCES

Johnson: "Control of Bovine Mastitis." The No. American Veterinarian, December 1944, pp. 724–730.

Little: "Effect of Gramicidin Suspended in Mineral Oil on Streptococci of Bovine Mastitis." Proceedings Soc. Exp. Biol. and Med., October 1940, pp. 462, 463.

OSRB Bi-monthly Progress Rept. No. 5, April 1, 1944, Committee on Medical Res., "Study of Vehicles and Adjuvants . . ." (3 pp.).

Ibid., Rpt. No. 6, June 15, 1944 (2 pp.).

Lourie: "Hair Fixatives," Soap Perfumery and Cosmetics, April 1940, pp. 238–242, 244 and 264, esp. at p. 241, 1st paragraph.

Fischer: "Unguntum Aluminii Stearatis." Ohio State Med. J., August 1942, p. 756.

"Sulvetil, With Penicillin," Abbott Drug and Cosmetic In., June 1950, p. 675.

"Sulvetil (Veterinary)," Unlisted Drugs, July 31, 1950, vol. 2, No. 7, p. 82 (abstract, referring to J. Am. Pharm. Assn., Pract. Pharm. Ed., vol. 11, June 1950, p. 340).